March 16, 1926.
O. A. HANFORD
1,576,745
APPARATUS FOR BLOWING GLASS
Filed Oct. 17, 1921
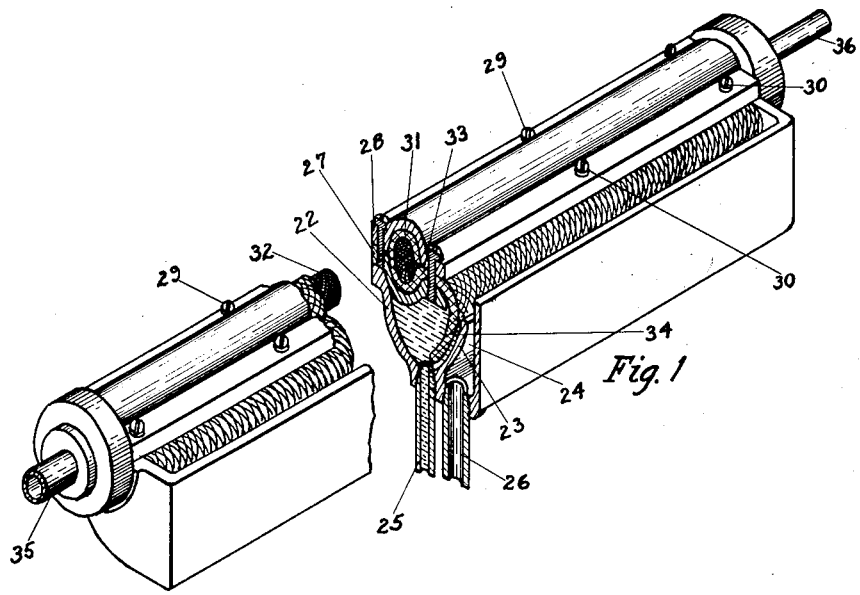
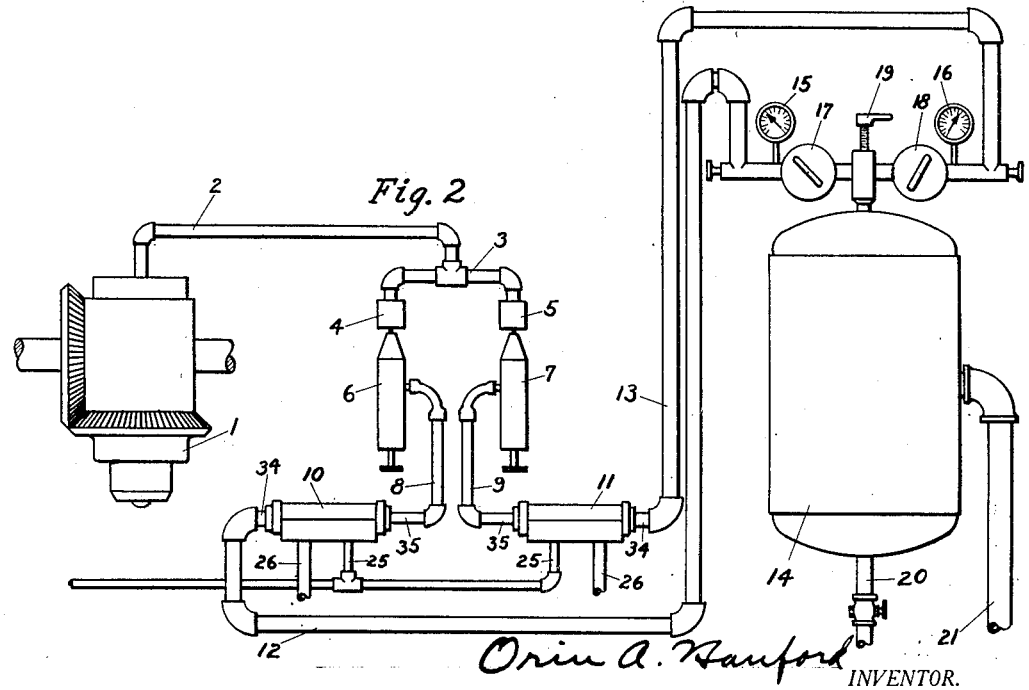
Orin A. Hanford INVENTOR.
BY
Edwin P. Corbett ATTORNEY.

Patented Mar. 16, 1926.

1,576,745

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO.

APPARATUS FOR BLOWING GLASS.

Application filed October 17, 1921. Serial No. 508,128.

*To all whom it may concern:*

Be it known that I, ORIN A. HANFORD, a citizen of the United States of America, residing at Columbus, in the county of Franklin and State of Ohio, have invented certain new and useful Improvements in Apparatus for Blowing Glass, of which the following is a specification.

My invention relates to apparatus for blowing glass and has particular relation to the introduction of air into partially formed blanks of glass during the stages leading to and including the final formation of the article to be produced. It is particularly suitable in connection with the production of blown glassware of the finer type, such as blown tumblers, electric light bulbs, etcetera.

The progress of the art has naturally taken the line of the development of mechanical rather than manual apparatus for the production of glass articles and is rapidly making headway in the field of the production of blown glassware. However, the use of compressed air in the blowing of glass by machinery is subject to serious defects of operation and the aim of this invention is to eliminate certain of these defects in a novel yet simple manner.

When glassware is blown by machinery, the fluid that is almost universally relied on for this blowing action is compressed air. However, I have observed that compressed air as ordinarily used has a very undesirable limitation as to expansiveness. In other words, it is extremely likely to cease expansion before it has accomplished the purpose for which it has been introduced into the article, as for instance, in the elongation of the blanks preparatory to final blowing. Furthermore, I have noticed that the degree of expansion of the compressed air varies with the humidity of the atmosphere, which imparts an unreliability extremely detrimental to the successful manufacture of the finer grades of ware. Finally, I have observed that these defects do not seem to exist in the manual production of blown glassware.

From the placing of these various facts side by side and an analytical consideration of such facts and other facts related thereto, I have come to believe that compressed air as normally used in blowing by machinery has a very important fault. This fault consists primarily in the fact that the air expands too quickly for the proper handling of the glass in the process of formation. Viscous glass is very sensitive but is far more responsive to pressure gradually and continuously applied than it is to pressure more suddenly applied. This is true whether it is being used in the introduction of "puffs" of air or whether it is being used in the prolonged admission of air into the blanks.

As a result of my study of this problem, I have devised a novel method and apparatus for treating the air to be used in the expansion of the blanks both in the introduction of the "puffs" of air and in the prolonged admission of air into the blanks. The treatment is such that when the air enters the blank and is subjected to the intense heat therein it will expand more slowly and to a greater extent and it will continue to expand for a greater length of time than it would if it were not for the treatment. This is particularly important in the introduction of the "puffs" of air during and prior to the step of elongation. Observation of the hand method will disclose that the "puffs" of air when introduced are more effective because of inherent expansiveness after introduction than because of the pressure under which they are introduced.

More specifically, my invention contemplates the addition of moisture to the air on its way to the blanks. The introduction of too much moisture would be worse than not enough or worse than none at all. Therefore, I have provided a novel and simple form of apparatus that will ensure the impregnation of the air with moisture in extremely fine particles that can have no tendency to spoil the product. The moisture is in the form of a vapor and it is carried to points where it will be picked up by the compressed air by means of capillarity. This capillary action is effected primarily by the use of a wick that is partially immersed in water or other desirable liquid and that is at all times subject to a regulating device by which the amount of moisture carried to the air can be completely and effectively controlled.

The device preferably takes the form of a wick with one end buried in the moistening fluid and with the other end enclosing a cylindrical screen member. The compressed air passes through the interior of this cylindrical screen member and picks up the moisture and then conducts it into the interior of the article being operated upon. The regulating means will be described in the description which follows.

The preferred embodiment of my invention is shown in the accompanying drawings wherein similar characters of reference designate corresponding parts and wherein—

Figure 1 is a perspective view of the main unit of my device.

Figure 2 is a diagrammatic view illustrating the path of the air to and through the moisture containing device and into the article to be blown.

In the drawings, the blank-holding head is shown at 1 and it may be generally stated that this blank holding head comprises a glass retaining collar together with rotating means and various other details of structure such as means for introducing air to the blank and for ejecting the blank from the head finally, etcetera. It will be understood that my apparatus comprises, preferably, a number of blank-holding heads and leading to each blank-holding head is a conduit 2 whereby compressed air is introduced into the blank.

The conduit 2 is provided with a T-formation 3 having socket members 4 and 5. Cooperating with these socket members 4 and 5 are air introducing elements 6 and 7 which are alternately movable into contact with their respective socket members, one of the members 6 and 7 being adapted to introduce the air for "puffing" the blank and the other being adapted for the introduction of the final "blowing" air. It will be understood that check valves are mounted in the socket members 5 so as to preclude the emission of air when the members 6 and 7 are removed from contact therewith.

Leading into each of the members 6 and 7 is a pipe structure and these pipe structures may be designated 8 and 9. They come from the units 10 and 11 which serve as conduits for air that is introduced thereto by means of piping 12 and 13. The piping units 12 and 13 lead from a compressed air reservoir 14 and are provided with gauges 15 and 16, reducing valves 17 and 18 and a main shut-off valve 19. The air reservoir is preferably provided with a drain pipe 20 and an inlet pipe 21.

The structure of the units 10 and 11 is a particularly important part of this invention and it is illustrated more clearly in Figure 1 of the drawings. As shown therein, it comprises a main tank 22 which is designed to contain water or other air moistening fluid and which is further provided with a low partition 23 that separates the main portion of the tank from a drain chamber 24. Water is introduced into the main tank 22 through the pipe 25 and when it reaches a given level it will overflow the partition 23 and pass away through the drain pipe 26. Mounted upon the main tank member is a sleeve formed in two superimposed parts 27 and 28. These superimposed parts are preferably connected by screws 29 and 30 and they are designed to enclose one end of a wick member 31 that is in turn wrapped about the reticulate cylinder 32. The opposite end of this wick member passes through a space 33 between the sleeve portions 27 and 28 on one side thereof and extends downwardly so that it is fully submerged in the water or other moistening fluid as at 34. The reticulate cylinder 32 is designed to be fed with compressed air at one end and by means of a pipe 35 and the compressed air passes through this reticulate member and out of the other end thereof by means of a smaller pipe 36.

In operation, the compressed air in passing from the reticulate cylinder 32 on its way to the blowing head will pick up the moisture from the wick 31 and will convey it to one of the members 6 or 7 and thence into the blowing head. The amount of moisture which is picked up by the air in passing through this reticulate cylinder will, of course, depend upon the extent to which the moisture has been raised by means of the capillary action of the wick. This, however, is regulable to the extent to which the screws 29 and 30 are tightened. If they are comparatively tight, the wick will be closely squeezed, particularly at the point where it enters the sleeve structure and this will result in a relatively slight degree of moisture passing to that portion of the wick which surrounds the reticulate cylinder with a consequent small amount of moisture picked up by the compressed air as it passes on its way to the blowing head.

It will be obvious that I have provided an extremely simple structure that has a minimum number of parts and yet can be made to operate effectively. Furthermore, the moisture delivered to the compressed air will be so finely divided that there will be no danger of delivering over-sized globules of moisture into the blank. The moisture-laden air will enter the blank with the moisture in the form of a fine vapor which will retard the heating of the air and consequently slow down and protract expansion of the air. The important ultimate result of this is that the pressure thus applied to the blank will be relatively gradual and prolonged which is better suited to the forming of viscous glass than quick and violent pressure.

This is a highly important development in the art. It will prevent the air from "going dead" after brief expansion with consequent tendency of the partially blown blank to collapse, as in the process of elongation.

It is within the bounds of my invention to substitute other mixtures of fluids than compressed air and water. For instance, certain chemicals may conceivably be used to slow down expansion or to increase the volume to which the fluid will expand.

Having thus described my invention, what I claim is:

1. Apparatus for delivering air to the interior of a glass blank comprising a receptacle containing a moistening fluid, a wick member over which the air passes, said wick member having a portion immersed in said moistening fluid.

2. Apparatus for delivering air to the interior of a glass blank comprising a receptacle containing a moistening fluid, a wick member over which the air passes, said wick member having a portion immersed in said moistening fluid, and a regulable clamp upon said wick member.

3. Apparatus for delivering air to the interior of a glass blank comprising a reticulate member along which said air is passed, and a moistening wick behind said reticulate member.

4. Apparatus for delivering air to the interior of a glass blank comprising a receptacle for containing a moistening fluid, a wick having a portion thereof immersed in the fluid in the said receptacle, and a reticulate member along which said air passes and on the opposite side of which a portion of said wick member rests.

5. Apparatus for delivering air to the interior of a glass blank comprising a receptacle containing a moistening fluid, a chamber with reticulate walls, means for passing air through said chamber, a wick member enclosing the walls of said chamber and having a portion immersed in said moistening fluid.

6. Apparatus for delivering air to the interior of a glass blank comprising a chamber with reticulate walls, a receptacle containing a moistening fluid, a wick member enclosing the walls of said chamber and having a portion immersed in said moistening fluid, and a clamp on said wick member in between that portion which is immersed in the moistening fluid and that portion which is in contact with the reticulate walls of said chamber.

7. Apparatus for delivering air to the interior of a glass blank comprising a chamber with reticulate walls, a receptacle containing a moistening fluid, a wick member adjacent the walls of said chamber and having a portion immersed in said moistening fluid, and a regulating clamp on said wick member in between that portion which is immersed in the moistening fluid and that portion which is adjacent with the reticulate walls of said chamber.

8. Apparatus for delivering air to the interior of a glass blank comprising a chamber, a pipe for conducting the air into said chamber, a relatively smaller pipe for conducting the air out of said chamber, the walls of said chamber being constructed to permit the passage of moisture therethrough, and a means for conducting moisture into contact with said walls.

9. Apparatus for delivering air to the interior of a glass blank comprising a moisture containing receptacle, a means to limit the level of moisture in said receptacle, a wick member immediately above said receptacle and having a portion thereof immersed in the moisture therein, and means for conducting the air into contact with another portion of said wick member on its way to said blank.

In testimony whereof I hereunto affix my signature.

ORIN A. HANFORD.